(12) United States Patent
Compri et al.

(10) Patent No.: US 11,515,772 B2
(45) Date of Patent: Nov. 29, 2022

(54) GENERATOR DEVICE OF ELECTRICAL ENERGY WITH PERMANENT MAGNETS, PARTICULARLY FOR THE SUPPLY OF ELECTRICAL LOADS AND/OR BATTERIES OF VEHICLES

(71) Applicant: DUCATI ENERGIA S.p.A., Bologna (IT)

(72) Inventors: Andrea Compri, Bologna (IT); Alessandro Berghi, Bologna (IT); Gianni Regazzi, Bologna (IT)

(73) Assignee: Ducati Energia S.p.A., Bologna (IT)

( * ) Notice: Subject to any disclaimer, the term of this patent is extended or adjusted under 35 U.S.C. 154(b) by 996 days.

(21) Appl. No.: 16/304,677

(22) PCT Filed: May 26, 2017

(86) PCT No.: PCT/IB2017/053116
§ 371 (c)(1),
(2) Date: Nov. 26, 2018

(87) PCT Pub. No.: WO2017/203479
PCT Pub. Date: Nov. 30, 2017

(65) Prior Publication Data
US 2020/0328664 A1 Oct. 15, 2020

(30) Foreign Application Priority Data
May 26, 2016 (IT) .......................... UA2016A003891

(51) Int. Cl.
*H02K 21/22* (2006.01)
*H02K 11/215* (2016.01)
(Continued)

(52) U.S. Cl.
CPC .......... *H02K 21/22* (2013.01); *H02K 7/1815* (2013.01); *H02K 11/048* (2013.01); *H02K 11/215* (2016.01); *F02N 11/04* (2013.01)

(58) Field of Classification Search
CPC .... H02K 21/22; H02K 11/215; H02K 7/1815; H02K 11/048; F02N 11/04
See application file for complete search history.

(56) References Cited

U.S. PATENT DOCUMENTS

| 2003/0094873 A1 | 5/2003 | Kim et al. |
| 2005/0040721 A1 | 2/2005 | Kusase et al. |

(Continued)

FOREIGN PATENT DOCUMENTS

| EP | 0233738 A1 | 8/1987 | |
| WO | WO-2015025669 A1 * | 2/2015 | ........... H02K 1/2793 |

*Primary Examiner* — Viet P Nguyen
(74) *Attorney, Agent, or Firm* — David B. Tingey; Bryant J. Keller; Kirton McConkie

(57) ABSTRACT

The generator device of electrical energy with permanent magnets, particularly for the supply of electrical loads and/or batteries of vehicles, connectable to at least a driving shaft of a motor, comprises: a rotor element rotating around an axis of rotation; a stator element contained inside the rotor element, or containing the rotor element, and coaxial to the rotor element, the stator element having a plurality of stator slots; a plurality of stator windings of a conductive material arranged at each of the stator slots and connected to a power supply line; a plurality of permanent magnets having a first side associated with the rotor element and a second side facing the stator element; wherein the permanent magnets are associated with the rotor element in a configuration of the Halbach array type to define a magnetic coupling to the stator windings wherein the magnetic field flow at the second side of each of the permanent magnets is substantially greater than the flow of the magnetic field at the first side of each of the permanent magnets.

2 Claims, 7 Drawing Sheets

(51) Int. Cl.
*H02K 7/18* (2006.01)
*H02K 11/04* (2016.01)
*F02N 11/04* (2006.01)

(56) References Cited

U.S. PATENT DOCUMENTS

2006/0238058 A1   10/2006  Koide et al.
2016/0211707 A1*   7/2016  Yamada .................. H02K 1/14

* cited by examiner

Fig.4a
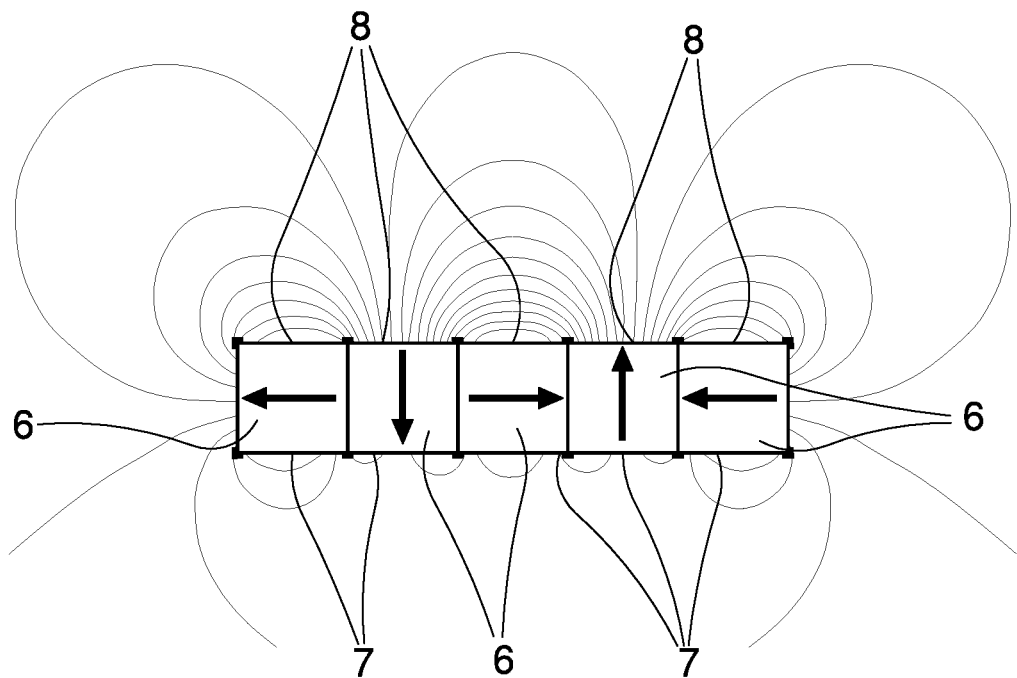
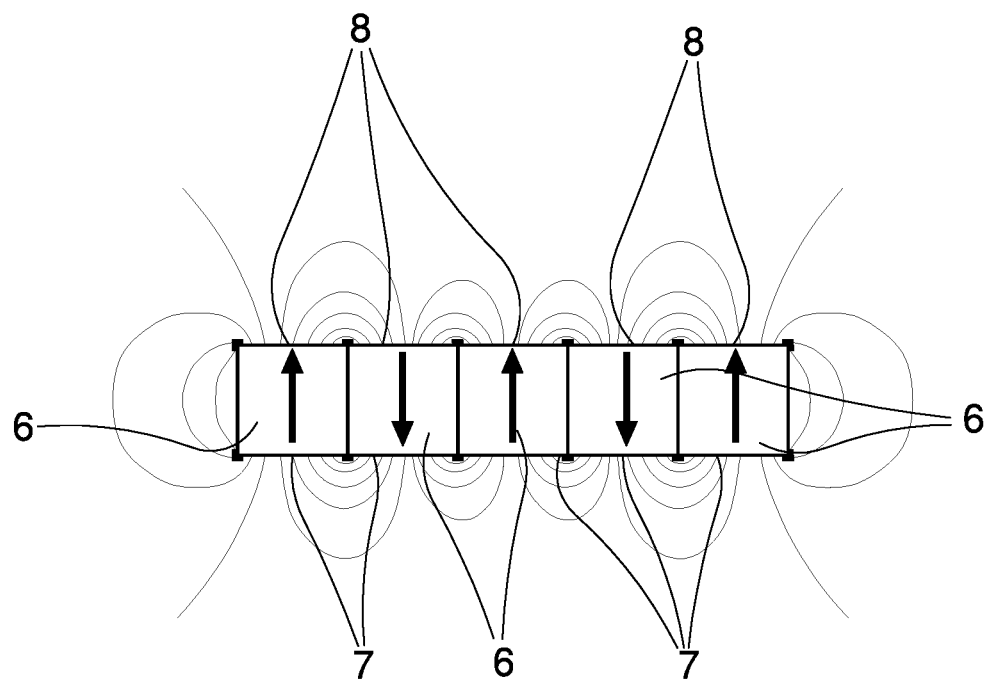
Fig.4b

| Type | Poles | Slots | Outer diameter [mm] | Pack thickness [mm] | Phase resistance [Ω] | Vacuum pressure (5000 rpm) [W] | Magnetic volume [mm³] |
|---|---|---|---|---|---|---|---|
| Classic | 16 | 18 | 163.5 | 20.0 | 0.30 | 365 | 17344 |
| Halbach | 16 | 18 | 163.5 | 13.5 | 0.20 | 302 | 14395 |

GENERATOR DEVICE OF ELECTRICAL ENERGY WITH PERMANENT MAGNETS, PARTICULARLY FOR THE SUPPLY OF ELECTRICAL LOADS AND/OR BATTERIES OF VEHICLES

TECHNICAL FIELD

The present invention relates to a generator device of electrical energy with permanent magnets, particularly for the supply of electrical loads and/or batteries of vehicles.

BACKGROUND ART

In the particular sector of devices for the supply of two or four-wheel motor vehicles with small or medium displacement for supplying on-board electrical loads and/or for recharging the battery, the use is known of electrical machines, of the type of permanent magnets generators, directly positioned on the driving shaft of a motor.

In particular, the use of permanent magnets, made of rare earths, permits obtaining compact and high performance generators particularly suited for all those applications where overall dimensions, weight and performance are the most important restraints for motor vehicle performance.

In some motorcycle applications, especially in the case of small-displacement motorcycles including, e.g., single cylinder 100 $cm^3$ engines, the power generator with permanent magnets can also perform the function of starting motor, thus becoming a motor generator.

In the particular field of motor generators, the electrical machine must develop a particularly high breakaway torque during start-up while maintaining low overall dimensions, compatibly with the type of motor drive indicated above.

It therefore follows that, in the field of motor generators, the characteristics of efficiency and compactness of the electrical machine are particularly important. Generally, in the above application field, the device 1' comprises a rotor element 2' and a stator element 3' contained inside or outside the rotor element 2'.

FIG. 1a schematically illustrates the structure of the generator device 1' with permanent magnets of known type.

The stator element 3' is composed of a lamellar pack, of the type of a small blade in ferromagnetic material, provided with a certain number of stator slots 4' inside which is positioned a stator winding 5', more precisely wound around each stator tooth defined between two adjacent stator slots 4'.

The rotor element 2' is composed of a cap or crown in ferromagnetic material inside which are positioned a certain number of permanent magnets 6', arranged in a classic configuration with alternate North-South polarity, defined like rotor magnetic poles.

More in detail, the permanent magnets 6' comprise a first side 7' associated with the rotor element 2' and a second side 8' facing the stator element 3'.

The number of stator slots 4' and the number of rotor magnetic poles is established according to the connection of the device 1', single-phase or three-phase, at maximum speed of engine rotation and to the electrical power required at the output of the device itself.

More in detail, the permanent magnets 6' are associated with the rotor element 2' and are spaced apart the one from the other by a fraction of the angle occupied by the permanent magnet itself.

In the particular field of motor generators, the generator device 1' with permanent magnets is also used to start the engine as well as to supply the electrical loads and/or the vehicle battery and the stator element 3' is connected to a poly-phase supply line having at least three phases.

Usefully, as shown schematically in FIG. 1b, the stator element 3' is provided with at least three Hall probes 9' fixed in suitable angular positions of the stator element itself according to the field of application.

The angular distance between the Hall probes 9' and the position of each Hall probe 9' on the stator element 3' are determined according to the number of stator slots 4', to the rotor magnetic poles and to the type of connection of the stator windings 5', generally three-phase which are connected in star or delta configuration.

Such devices 1' of known type, once connected to a suitable electronic unit (inverter) substantially operate like a brushless motor and, at the same time, like an electrical generator.

In particular, the Hall probes 9' provide the inverter with the angular position of the rotor in such a way as to provide the correct power supply of the three or more phases of the electric machine, thus setting the right piloting sequence during the start-up phase wherein the operation of the system substantially coincides with the operation of a motor, e.g., of the brushless type which starts an internal combustion engine.

Following the start of the internal combustion engine, the device 1' locked together with the driving shaft of the internal combustion engine is made to operate like a generator controlled by means of the inverter to regulate the electrical current supplied to the battery and to the electrical loads so as to maintain the voltage of the battery constant even when the electrical load varies. During the start-up phase, in the fields of application indicated above, the device 1' must develop particularly high breakaway torques to reach driving shaft rotation speeds of up to about 700 rpm.

The electrical generator and motor generator devices of known type have their main drawback tied to low performance in terms of energy output and efficiency.

Another drawback is related to the dimensions and overall dimensions of the generators and motor generators of known type and to the related dissipations of energy due to the Joule effect caused by stator windings of considerable size to obtain the desired magnetic induction values at the stator element.

Yet another drawback is tied to the overall dimensions and in particular the dimensions of the stator element in cases of application on engines with small and medium displacement.

DESCRIPTION OF THE INVENTION

The main aim of the present invention is to provide a generator device of electrical energy with permanent magnets, particularly for the supply of electrical loads and/or batteries of vehicles, which allows achieving high operating output and efficiency and a consequent reduction in the consumption of vehicle fuel.

One object of the present invention is to provide a generator device of electrical energy with permanent magnets, particularly for the supply of electrical loads and/or batteries of vehicles, which is small in size and has small overall dimensions compatibly with the dimensions of vehicles and/or motor vehicles with small or medium displacement.

Another object of the present invention is to provide a generator device of electrical energy with permanent magnets, particularly for the supply of electrical loads and/or batteries of vehicles, which allows to overcome the mentioned drawbacks of the prior art within the ambit of a simple, rational, easy, effective to use and low cost solution.

The above mentioned objects are achieved by the present generator device of electrical energy with permanent magnets, particularly for the supply of electrical loads and/or batteries of vehicles, having the characteristics of claim 1.

BRIEF DESCRIPTION OF THE DRAWINGS

Other characteristics and advantages of the present invention will become more evident from the description of a preferred, but not exclusive, embodiment of a generator device of electrical energy with permanent magnets, particularly for the supply of electrical loads and/or batteries of vehicles, illustrated by way of an indicative, but non-limiting example in the accompanying drawings, wherein:

FIG. 4a illustrates the radiation diagram of the magnetic field flow of the device according to the invention;

FIG. 4b illustrates the radiation diagram of the magnetic field flow of a device of known type;

EMBODIMENTS OF THE INVENTION

Figure 1A:
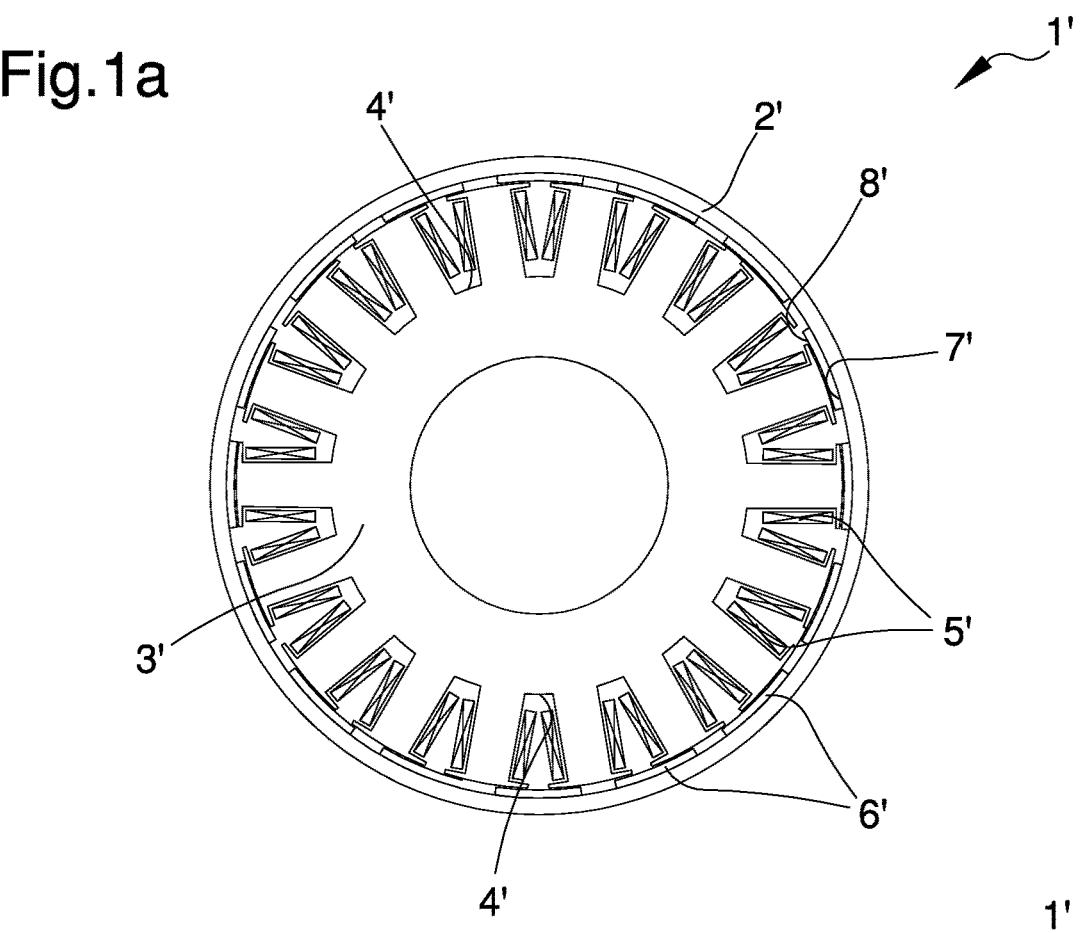
FIG. 1a is a sectional view of a device of known type in a first embodiment.
Figure 1B:
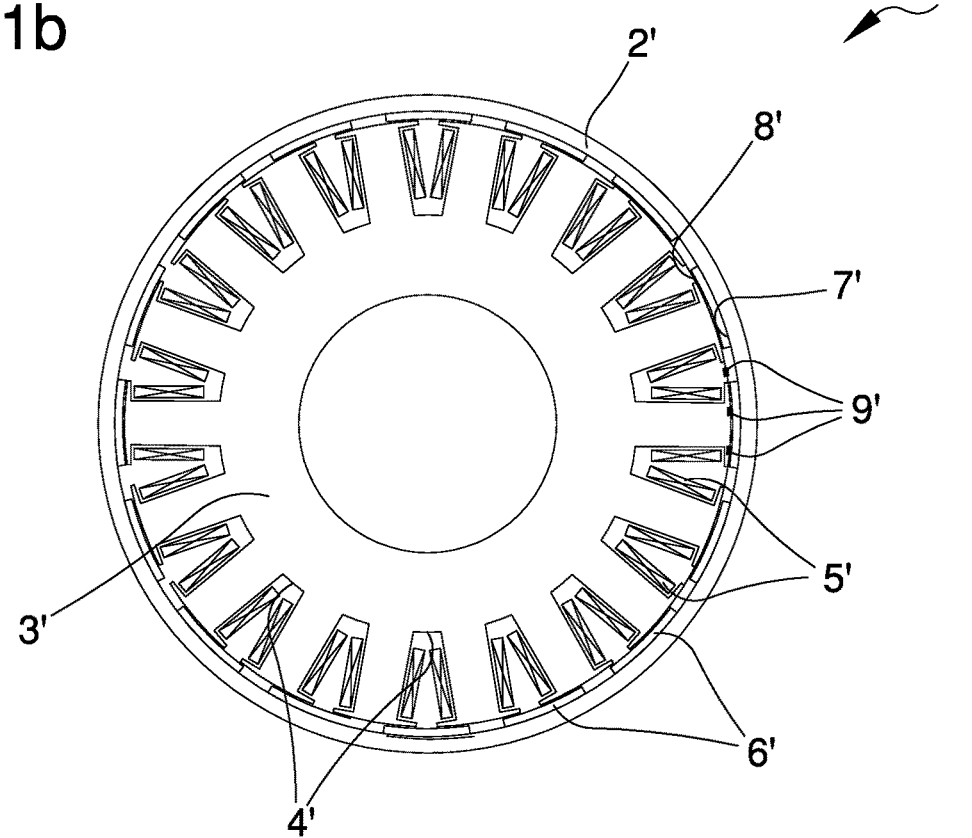
FIG. 1b is a sectional view of a device of known type in a second embodiment.

With particular reference to such figures, globally indicated with reference numeral 1 is a generator device of electrical energy with permanent magnets, particularly for the supply of electrical loads and/or batteries of vehicles.

The device 1 is connectable to a driving shaft of an engine, e.g. of the type of an internal combustion engine, and comprises:
- a rotor element 2 rotating around a relevant axis of rotation;
- a stator element 3 contained inside the rotor element 2, or containing the rotor element 2, coaxial to the rotor element 2 and having a plurality of stator slots 4;
- a plurality of stator windings 5 made of a conductive material arranged at each of the stator slots 4 and connected to a power supply line;
- a plurality of permanent magnets 6 having a first side 7 associated with the rotor element 2 and a second side 8 facing the stator element 3.

The stator element 3 is composed of a lamellar pack made of ferromagnetic material and the rotor element 2 is composed of a cap or crown made of ferromagnetic material.

Alternative embodiments cannot however be ruled out wherein the rotor element 2 is made of a material other than ferromagnetic material, e.g., of diamagnetic or paramagnetic material.

In the embodiments shown in the illustrations, the stator element 3 is contained inside the rotor element 2 and these are coaxial to one another.

More in detail, between the stator element 3 and the rotor element 2 is an interspace containing air or dielectric material, commonly known as air gap, such as to allow the rotation of the rotor element 2 with respect to the stator element 3.

Alternative embodiments cannot however be ruled out wherein the rotor element 2 is contained inside the stator element 3 and these are coaxial to one another.

According to the invention, the permanent magnets 6 are associated with the rotor element 2 in a configuration of the Halbach array type to define a magnetic coupling to the stator windings 5 wherein the flow of the magnetic field at the second side 8 of each of the permanent magnets 6 is substantially greater than the flow of the magnetic field at the first side 7 of each of the permanent magnets 6.

Within the scope of this treatise, with the expression Halbach array is meant the particular configuration wherein a plurality of permanent magnets 6 are arranged in contact with one another so as to strengthen and intensify the magnetic field along one face of the array, which in the embodiments shown in the illustrations is substantially defined by the second sides 8 of the permanent magnets 6 turned towards the stator element 3, and at the same time cancel by interference the magnetic field which develops on the opposite face, substantially defined by the first sides 7 of the permanent magnets 6.

Figure 2:
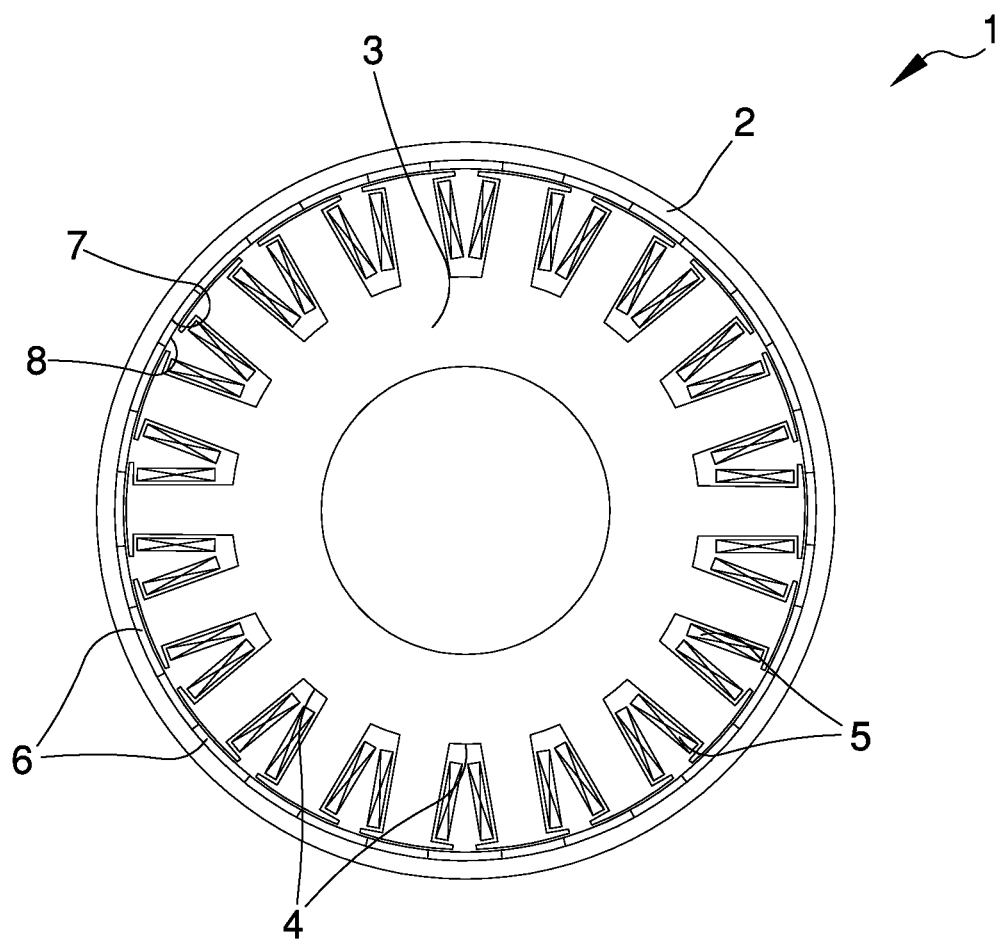
FIG. 2 is a sectional view of the device according to the invention in a first embodiment.

In a first embodiment shown in FIG. 2, the device 1 is a generator with permanent magnets wherein the permanent magnets 6 are arranged in the Halbach array configuration.

Figure 3:
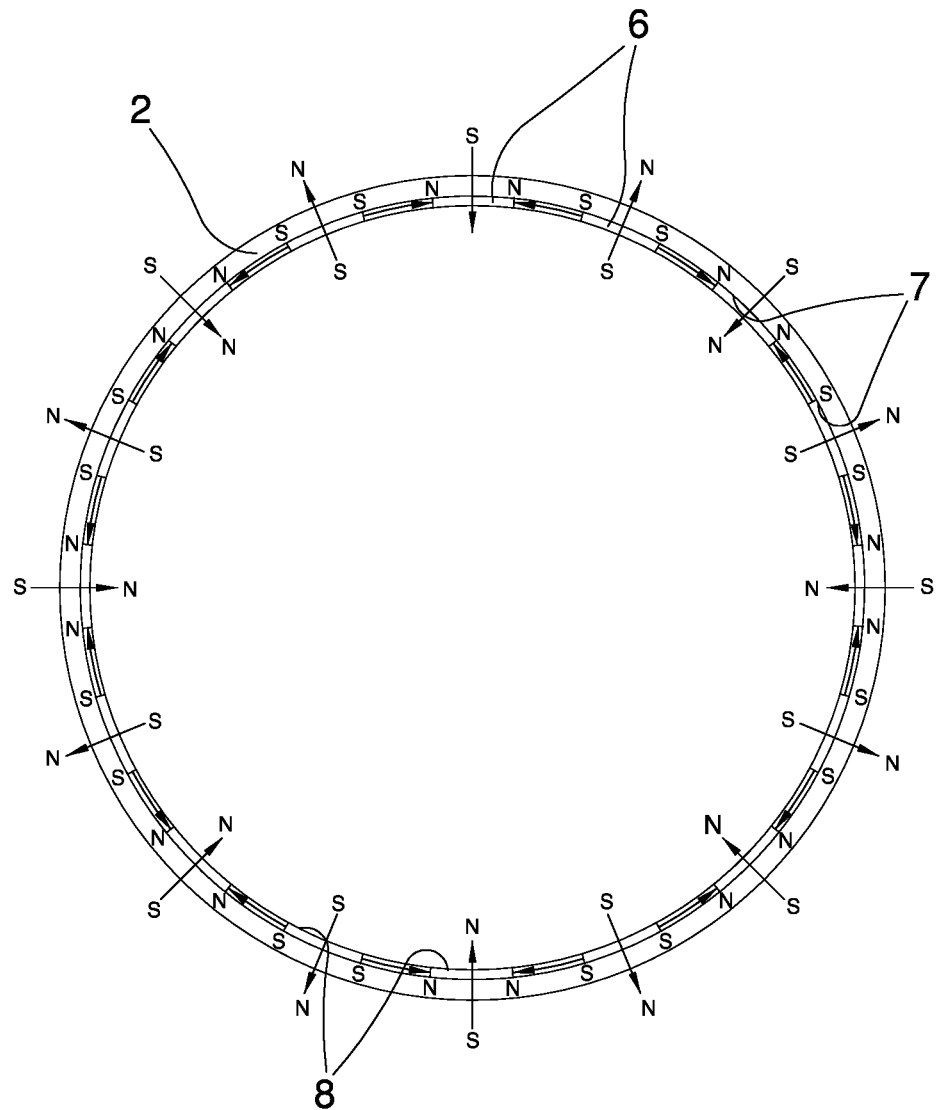
FIG. 3 is a schematic representation of a detail of the device according to the invention.

More in detail, FIG. 3 illustrates the arrangement and the orientation of the North and South poles of the permanent magnets 6 which are associated with the rotor element 2 so as to achieve the Halbach array configuration.

By way of example and explanation, FIG. 4a illustrates the radiation diagram of the magnetic field in the event of the permanent magnets 6 being arranged in the Halbach array configuration; while FIG. 4b illustrates the radiation diagram of the magnetic field in the event of the permanent magnets 6 being arranged in a classic configuration with alternated polarities.

Figure 5:
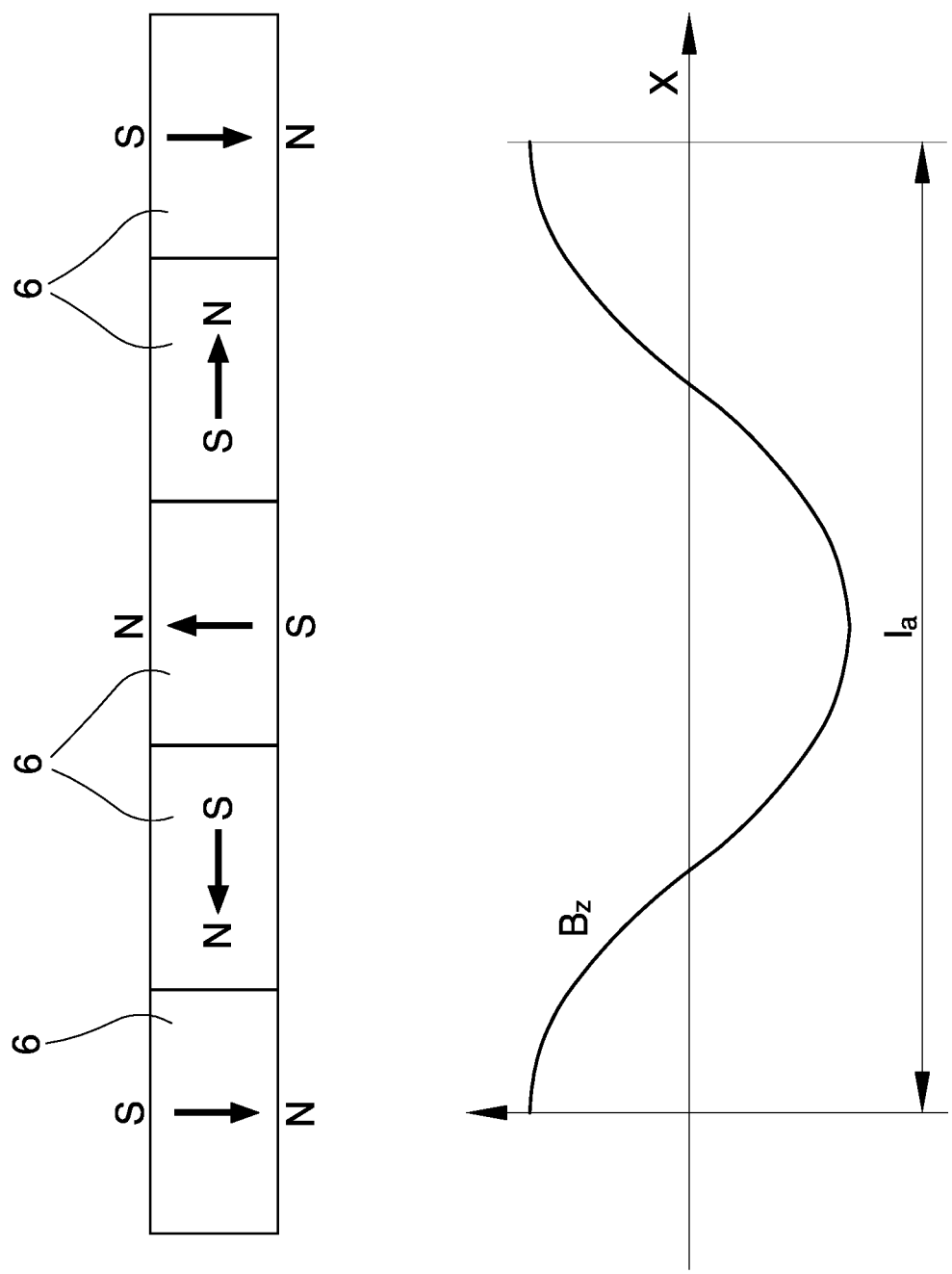
FIG. 5 graphically illustrates the pattern of the magnetic induction quantity $B_z$ according to the distance x.

FIG. 5 graphically illustrates the magnetic induction pattern according to the intensity of the magnetic field.

More in detail, the magnetic induction quantity is indicated by $B_z$, the distance quantity is indicated by x while the pole pitch quantity is indicated by $I_a$.

In particular, it can be seen that the magnetic induction $B_z$ according to the distance x has a substantially sinusoidal pattern, different with respect to the pattern obtained for the devices of known type.

Figure 6:
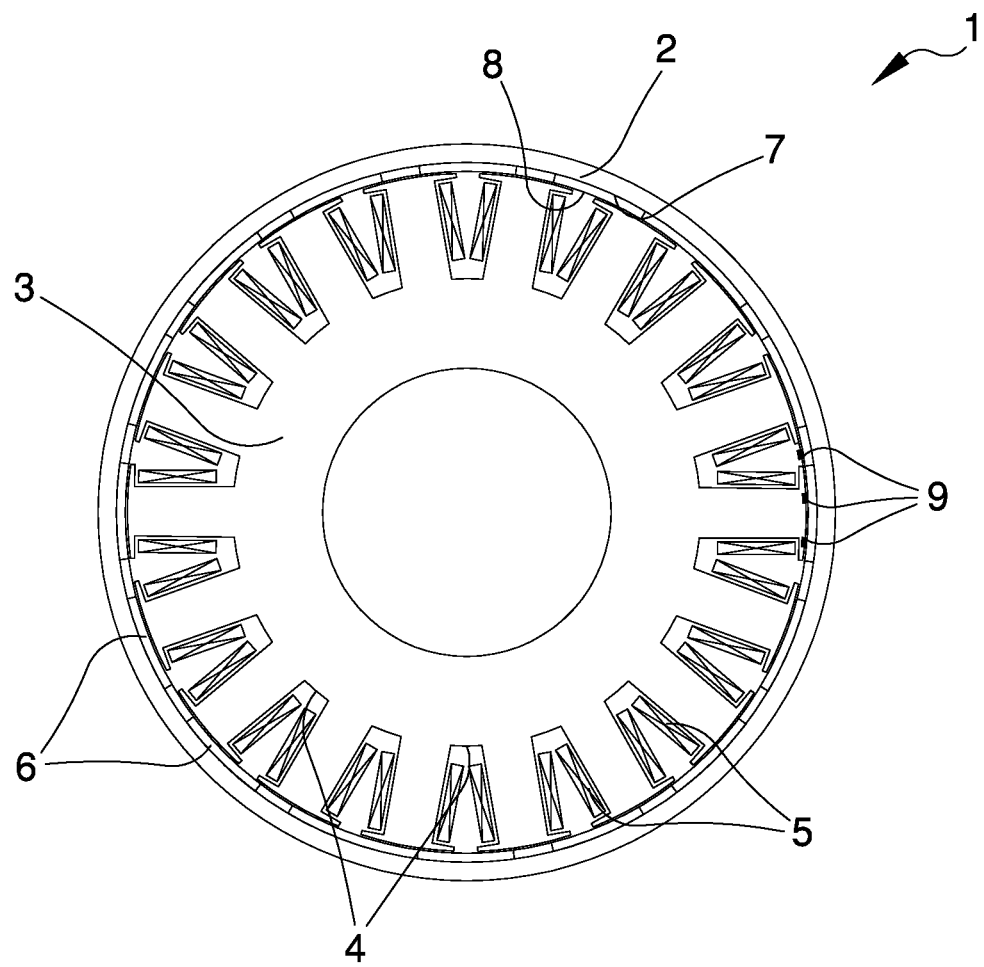
FIG. 6 is a sectional view of the device according to the invention in a second embodiment.

In a second embodiment shown in FIG. 6, the device 1 is a motor generator with permanent magnets.

More in detail, the device 1 is operatively connected to the driving shaft and the stator element 3 is connected to a poly-phase power supply line, having at least three supply phases, in turn connected to an inverter device.

In particular, the inverter device is an electronic device adapted to rectify the alternating current supplied by the device 1 to supply the battery and/or the electrical loads when it operates as a generator, after the internal combustion engine is started; vice versa the inverter device is adapted to convert the direct current into poly-phase alternating current to supply the device 1 during the start-up phase wherein the device itself operates as a brushless motor to start the internal combustion engine.

In such a second embodiment, the device 1 comprises detection means 9 of the intensity of the flow of the magnetic field, generated by the device itself, which are operatively connected to the inverter device to activate the rotation and the regulation of the rotation speed of the driving shaft during the start-up phase.

The detection means 9 are adapted to provide a value relating to the angular position of the rotor element 2 with respect to the stator element 3.

Preferably, the detection means 9 are of the type of one or more Hall probes. Advantageously, the Hall probes 9 are associated with the stator element 3 so that the angular distance between each Hall probe 9 with respect to the stator element 3 is dependent on and related to the number of stator slots 4, to the number of phases and to the number of permanent magnets 6 associated with the rotor element 2.

More in detail, the Hall probes 9 provide the inverter device with the angular position of the rotor element 2 with respect to the stator element 3 and, depending on such angular position, the inverter device is adapted to regulate the poly-phase supply of the stator element 3 during the start-up phase of the device 1.

Figures 7, 8:
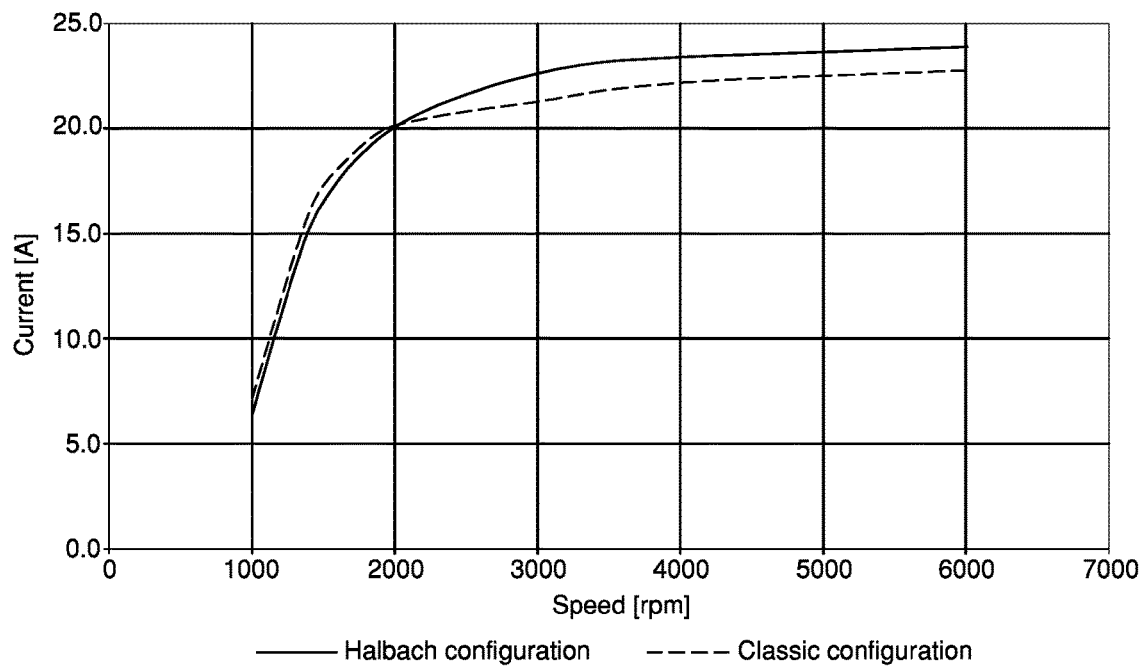
FIG. 7 illustrates a comparative graph between the performance obtained by a device of known type, in which the permanent magnets are arranged in a classic configuration, and by the device according to the invention, in which the permanent magnets are arranged in the Halbach configuration.
FIG. 8 illustrates a comparative table of the results obtained by a device of known type, in which the permanent magnets are arranged in a classic configuration, and by the device according to the invention, in which the permanent magnets are arranged in the Halbach configuration.

FIGS. 7 and 8 illustrate, by way of example, the results relating to the performance achieved by the device 1 in the event of the permanent magnets 6 being arranged in the classic configuration with the North and South polarities alternated the one with the other and in the event of the permanent magnets 6 being arranged in the Halbach array configuration.

In particular, both the devices 1, when compared, have the same outer diameter and diameter at air gap as well as the same number of rotor poles (in this specific case 16 rotor poles) and the same number of stator slots 4 (in this specific case 18 stator slots) with three-phase stator windings 5 with star connection.

The results shown in FIGS. 7 and 8 refer to the performance obtained by measuring the current at the output of each of the devices 1 connected to a three-phase supply line and to a constant voltage of 14 V.

More in detail, from the table in FIG. 8, it can be seen that in the case of Halbach array configuration of the permanent magnets 6, a reduction is obtained in the phase resistance which consequently leads to a reduction of losses in copper.

This characteristic is particularly important in the event of the device 1 being a generator with permanent magnets combined with a shunt type regulator.

The same results in terms of efficiency and indicated overall dimensions can also be obtained in the event of the device 1 being a motor generator with permanent magnets.

It has in fact been ascertained that the described invention achieves the intended objects and in particular the fact is underlined that the device made this way permits reducing the magnetic induction in the rotor element and increasing the magnetic induction to the stator element and to the air gap without any increase in the outer dimensions and overall dimensions of the rotor element.

This is therefore followed by a reduction in losses due to dissipation in the rotor element and by a considerable increase in magnetic induction to the air gap which permit reducing the thickness of the stator element, and therefore the overall dimensions of the device, as well as increasing the performance of the device itself.

In other words, the reduction in thickness of the stator element, the magnetic flow in the stator element itself being equal, permits reducing the length of the stator windings and at the same time results in a reduction of the electrical resistance of the stator winding and therefore of the losses by Joule effect in copper.

The invention claimed is:

1. A permanent magnet motor generator, particularly for a supply of electrical loads and/or batteries of vehicles, connectable to at least a driving shaft of a motor, comprising:

at least a rotor element rotating around an axis of rotation;

at least a stator element contained inside said rotor element, or containing said rotor element, and coaxial to said rotor element, said stator element having a plurality of stator slots;

a plurality of stator windings of a conductive material arranged at each of said plurality of stator slots and connected to a power supply line;

a plurality of permanent magnets having at least a first side associated with said rotor element and at least a second side facing said stator element;

detection means comprising Hall probes for detecting an intensity of a magnetic field flow of said permanent magnet motor generator, the detection means being operatively connected to an inverter device, with said detection means being adapted to provide a value relating to an angular position of said rotor element with respect to said stator element; and an air gap that is disposed between the stator element and the rotor element, the air gap comprising at least one of (i) air and (ii) a dielectric material, and the air gap being configured to allow for rotation of the rotor element with respect to the stator element, wherein said plurality of permanent magnets are associated with said rotor element in a configuration of a Halbach array type to define a magnetic coupling to said plurality of stator windings, wherein a magnetic field flow at said second side of each of the permanent magnets is substantially greater than a flow of a magnetic field at said first side of each of the plurality of permanent magnets, wherein said permanent magnet motor generator is operatively connected to said driving shaft, wherein said stator element is connected to a poly-phase power supply line, having at least three supply phases, which is connected to an inverter device, wherein said inverter device is adapted to activate rotation and adjustment of a rotation speed of said driving shaft, wherein said detection means are associated with the stator element so that an angular distance between each of the Hall probes with respect to the stator element is dependent on a number of the plurality of stator slots, a number of phases, and a number of the plurality of permanent magnets associated with the rotor element, and wherein the Hall probes provide said inverter device with said angular position of said rotor element with respect to said stator element, and depending on said angular position, said inverter device is adapted to regulate the poly-phase power supply line connected to said stator element during a start-up phase of the permanent magnetic motor generator.

2. A permanent magnet motor generator, particularly for a supply of electrical loads and/or batteries of a motorcycle, connectable to at least a driving shaft of a motor, comprising:

at least a rotor element rotating around an axis of rotation;

at least a stator element contained inside said rotor element, or containing said rotor element, and coaxial to said rotor element, said stator element having a plurality of stator slots;

a plurality of stator windings of a conductive material arranged at each of said plurality of stator slots and connected to a power supply line; and a plurality of permanent magnets having at least a first side associated with said rotor element and at least a second side facing said stator element, wherein said plurality of permanent magnets are associated with said rotor element in a configuration of a Halbach array type to define a magnetic coupling to said plurality of stator windings, wherein a magnetic field flow at said second side of each of the permanent magnets is substantially greater than a flow of a magnetic field at said first side of each of the plurality of permanent magnets, wherein said permanent magnet motor generator is operatively connected to said driving shaft, wherein said stator element is connected to a poly-phase power supply line, having at least three supply phases, which is connected to an inverter device, wherein said inverter device is adapted to activate rotation and adjustment of a rotation speed of said driving shaft, wherein the permanent magnet motor generator is configured to provide high breakaway torque during start-up while maintaining low overall dimensions, wherein the permanent magnet motor generator is configured to reduce magnetic induction in said rotor element and increasing magnetic induction to the stator element and to an air gap without requiring any increase in outer dimensions and overall dimensions of the rotor element, and wherein the permanent magnet motor generator is configured to reduce losses due to dissipation in the rotor element and increase magnetic induction to the air gap which permits reducing a thickness of the stator element and the overall dimensions of the permanent magnet motor generator and to increase performance of the permanent magnet motor generator.

\* \* \* \* \*